United States Patent
Liu et al.

(10) Patent No.: US 10,294,703 B2
(45) Date of Patent: May 21, 2019

(54) HINGE MODULE AND ASSEMBLING METHOD

(71) Applicant: Wistron Corporation, New Taipei (TW)

(72) Inventors: Yu-Ju Liu, New Taipei (TW); Chi-Hsiu Hung, New Taipei (TW)

(73) Assignee: Wistron Corporation, New Taipei (TW)

( * ) Notice: Subject to any disclaimer, the term of this patent is extended or adjusted under 35 U.S.C. 154(b) by 53 days.

(21) Appl. No.: 15/456,587

(22) Filed: Mar. 13, 2017

(65) Prior Publication Data

US 2018/0119727 A1  May 3, 2018

(30) Foreign Application Priority Data

Nov. 3, 2016  (TW) ............... 105135775 A

(51) Int. Cl.
*E05D 3/12*  (2006.01)
*E05D 3/06*  (2006.01)
(Continued)

(52) U.S. Cl.
CPC ............... *E05D 3/12* (2013.01); *E05D 3/06* (2013.01); *E05D 3/122* (2013.01); *E05D 7/00* (2013.01);
(Continued)

(58) Field of Classification Search
CPC .. E05D 3/06; E05D 3/12; E05D 3/122; E05D 3/18; E05D 11/06; E05D 11/1028; E05D 11/1078
(Continued)

(56) References Cited

U.S. PATENT DOCUMENTS

| 880,697 A | * | 3/1908 | Soss | ............... E05D 3/18 16/357 |
| 6,253,419 B1 | * | 7/2001 | Lu | ............... G06F 1/1618 16/340 |

(Continued)

FOREIGN PATENT DOCUMENTS

| JP | 2016038040 | 3/2016 |
| TW | M493241 | 1/2015 |
| TW | M521281 | 5/2016 |

OTHER PUBLICATIONS

"Office Action of Taiwan Counterpart Application," dated May 25, 2018, p1-p5.

(Continued)

*Primary Examiner* — Jeffrey O'Brien
(74) *Attorney, Agent, or Firm* — JCIPRNET

(57) ABSTRACT

A hinge module includes a first motion component, a second motion component, a third motion component, an axle module and a linking member. The second motion component has a pushing portion. The axle module includes a first axle and a second axle. The linking member is pivoted to the first motion component by the first axle, the second motion component and the linking member are pivoted to the third motion component by the second axle. When the second motion component is rotated from a first operation state to a second operation state, the second motion component props against the linking member by the pushing portion, such that the third motion component is driven to rotate by the linking member. When the second motion component continues rotating from the second operation state, the pushing portion is separated from the linking member.

36 Claims, 15 Drawing Sheets

(51) Int. Cl.
*E05D 7/00* (2006.01)
*G06F 1/16* (2006.01)

(52) U.S. Cl.
CPC ...... *G06F 1/1607* (2013.01); *E05Y 2900/606* (2013.01)

(58) Field of Classification Search
USPC .................................. 16/362, 363, 365, 366
See application file for complete search history.

(56) References Cited

U.S. PATENT DOCUMENTS

| | | | | |
|---|---|---|---|---|
| 6,925,684 B2* | 8/2005 | Kang | ............... | G06F 1/1616 16/264 |
| 8,082,633 B2* | 12/2011 | Mizuta | ............... | H04M 1/0212 16/363 |
| 8,572,812 B2* | 11/2013 | Mizuta | ............... | H04M 1/0212 16/363 |
| 8,914,946 B2* | 12/2014 | Hsu | ............... | F16H 21/44 16/342 |
| 8,938,856 B1* | 1/2015 | Shin | ............... | E05D 3/06 16/365 |
| 8,966,715 B1* | 3/2015 | Chen | ............... | H04M 1/022 16/303 |
| 9,021,658 B1* | 5/2015 | Yang | ............... | G06F 1/1681 16/366 |
| 9,489,054 B1* | 11/2016 | Sumsion | ............... | G06F 3/0208 |
| 9,524,000 B2* | 12/2016 | Hsu | ............... | G06F 1/1681 |
| 9,921,613 B2* | 3/2018 | Kuramochi | ............... | E05D 3/06 |
| 9,976,327 B2* | 5/2018 | Dreisewerd | ............... | E05D 3/18 |
| 2007/0094846 A1* | 5/2007 | Ishida | ............... | E05D 3/122 16/354 |
| 2008/0157754 A1* | 7/2008 | Kim | ............... | G01R 33/07 324/207.2 |
| 2010/0071159 A1* | 3/2010 | Myung | ............... | H04M 1/022 16/303 |
| 2012/0304419 A1* | 12/2012 | Mai | ............... | E05D 11/06 16/374 |
| 2013/0135809 A1* | 5/2013 | Uchiyama | ............... | G06F 1/1681 361/679.09 |
| 2014/0338482 A1* | 11/2014 | Hsu | ............... | F16H 19/08 74/96 |
| 2015/0052707 A1* | 2/2015 | Lin | ............... | G06F 1/1618 16/366 |
| 2015/0189777 A1* | 7/2015 | Hsu | ............... | H05K 5/0226 16/366 |
| 2015/0362958 A1* | 12/2015 | Shang | ............... | G06F 1/1681 361/679.58 |
| 2018/0119467 A1* | 5/2018 | Liu | ............... | E05D 3/02 |
| 2018/0120905 A1* | 5/2018 | Liu | ............... | G06F 1/1616 |
| 2018/0145714 A1* | 5/2018 | Li | ............... | G06F 1/16 |

OTHER PUBLICATIONS

"Office Action of Taiwan Counterpart Application," with partial English translation, dated Jul. 6, 2017, p1-p25, in which the listed reference was cited.
"Office Action of Japan Counterpart Application," dated Apr. 27, 2018, p1-p5, in which the listed reference was cited.

* cited by examiner

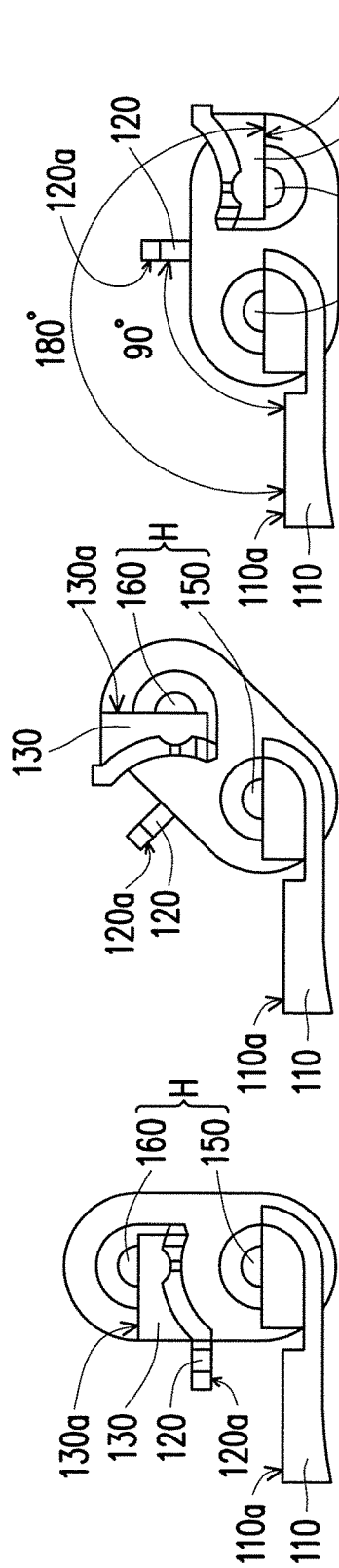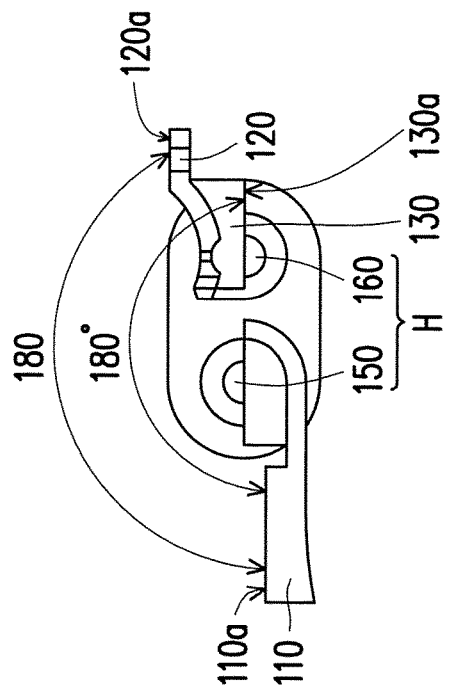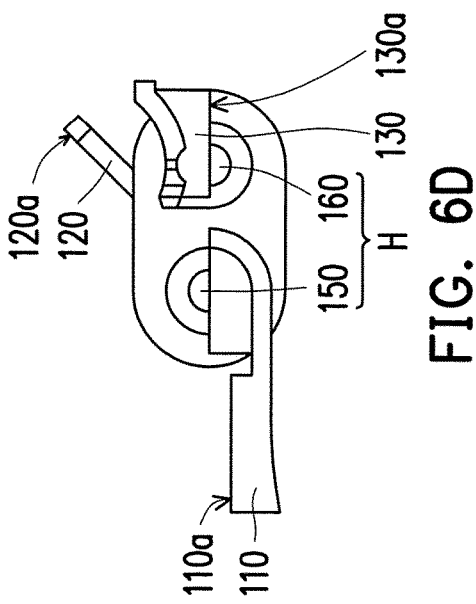
FIG. 6A  FIG. 6B  FIG. 6C  FIG. 6D  FIG. 6E

HINGE MODULE AND ASSEMBLING METHOD

CROSS-REFERENCE TO RELATED APPLICATION

This application claims the priority benefit of Taiwan application serial no. 105135775, filed on Nov. 3, 2016. The entirety of the above-mentioned patent application is hereby incorporated by reference herein and made a part of this specification.

BACKGROUND OF THE INVENTION

Field of the Invention

The disclosure relates to a hinge module and an assembling method, more specifically relates to a hinge module having two axles and an assembling method of several components thereof.

Description of Related Art

Tablet computers (tablet PCs) have been gradually popularized in consumer market because of their advantages, such as light weight and portable. In order to allow the user to enter inputs into the tablet PC via a physical keyboard, the tablet PC can be inserted into a docking station having a keyboard module so as become similar to a notebook computer.

In general, the weight of the tablet PC is greater than the weight of the docking station, which leads to instability of the whole structure caused by position of the center of gravity. Although increasing the weight the of the docking station can solve the instability problem caused by position of the center of gravity, the tablet PC and its docking station lose an advantage of light weight. In addition, some docking stations are designed to have a supporting structure that is configured to solve the instability problem caused by position of the center of gravity. However, in general, the supporting structure of the docking station can only support the tablet PC at a specific tilt angle, so the user cannot adjust the tilt angle of the tablet PC to any angle according to requirement. Furthermore, some tablet PCs are designed to have a foot stand for supporting themself, which is configured to solve the instability problem caused by position of the center of gravity. However, the supporting area of this foot stand in the tablet PC is generally small, the tablet PC easily causes discomfort when being placed on the thigh of the user, and the tilt angle of the tablet PC is limited because the foot stand is located at the back of the tablet PC.

SUMMARY OF THE INVENTION

The disclosure provides a hinge module capable of freely adjusting a tilt angle of an electronic device and preventing discomfort caused when a foot stand of the electronic device is placed on the thigh of the user.

A hinge module of the disclosure includes a first motion component, a second motion component, a third motion component, an axle module, and a linking member. The second motion component is connected between the first motion component and the third motion component and has a pushing portion. The axle module includes a first axle and a second axle. The linking member is pivoted to the first motion component by the first axle, the second motion component and the linking member are pivoted to the third motion component by the second axle, and the linking member is adapted to move along the axle module. When the second motion component is rotated relative to the first motion component from a first operation state to a second operation state, the second motion component props against the linking member by the pushing portion to drive the third motion component to be synchronously rotated relative to the first motion component by the linking member, and to drive the linking member to move along a first axle and a second axle of the axle module. When the second motion component continues rotating relative to the first motion component from the second operation state, the pushing portion is separated from the linking member along with movement of the linking member, and the second motion component is adapted to continue rotating relative to the first motion component from the second operation state to a third operation state.

In one embodiment of the disclosure, when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, when the included angle between the first motion component and the second motion component is increased from the first angle to the second angle, the second motion component, the linking member, the second axle, and the third motion component are simultaneously rotated about the first axle and relative to the first motion component.

In one embodiment of the disclosure, when the included angle between the first motion component and the second motion component is increased from the second angle to the third angle, the second motion component is rotated about the second axle and relative to the first motion component, the first axle, the linking member, and the third motion component.

In one embodiment of the disclosure, an axial direction of the first axle is parallel to an axial direction of the second axle, the linking member is slidably disposed on the first axle and the second axle along the axial direction of the first axle and the axial direction of the second axle.

In one embodiment of the disclosure, the linking member has a guiding slot, the first axle has a column body thereon, an extending direction of the guiding slot is inclined with respect to the axial direction of the first axle, the column body is located in the guiding slot, and when the linking member is rotated relative to the first axle, the column body is moved along the guiding slot to drive the linking member to move along the first axle.

In one embodiment of the disclosure, the guiding slot has a first end and a second end opposite to each other, when the included angle between the first motion component and the second motion component is increased from the first angle to the second angle, the column body is moved from the first end toward the second end, and the second end blocks the column body to stop the third motion component from continuing to rotate relative to the first motion component.

In one embodiment of the disclosure, a length of the pushing portion along the axial direction of the second axle is greater than or equal to a stroke length of the guiding slot along the axial direction of the first axle.

In one embodiment of the disclosure, a stroke length of the guiding slot along the axial direction of the first axle is greater than a contact length between the pushing portion and the linking member along the axial direction of the second axle.

In one embodiment of the disclosure, the hinge module includes a first gear and a second gear, wherein the first gear is disposed on the first axle, the second gear is disposed on the second axle and engaged with the first gear, and when the included angle between the first motion component and the second motion component is increased from the first angle to the second angle, the third motion component is rotated relative to the second motion component by driving of the first gear and the second gear.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component is the second angle, the included angle between the first motion component and third motion component is the third angle.

In one embodiment of the disclosure, the second motion component has a stop portion, when the included angle between the first motion component and the second motion component is increased to the third angle, the stop portion leans against the linking member to stop the second motion component from continuing to rotate relative to the first motion component.

A hinge module of the disclosure includes a first motion component, a second motion component, a third motion component, an axle module, and a linking member. The second motion component is connected between the first motion component and the third motion component and has a pulling portion. The axle module includes a first axle and a second axle. The linking member is pivoted to the first motion component by the first axle, the second motion component and the linking member are pivoted to the third motion component by the second axle. The second motion component is adapted to rotate relative to the first motion component from a third operation state to a second operation state. When the second motion component continues rotating relative to the first motion component from the second operation state, the pulling portion is in contact with the linking member along with rotation of the second motion component. When the second motion component is rotated relative to the first motion component from the second operation state to a first operation state, the second motion component props against the linking member by the pulling portion to drive the third motion component to be synchronously rotated relative to the first motion component by the linking member.

In one embodiment of the disclosure, when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, when the included angle between the first motion component and the second motion component is decreased from the third angle to the second angle, the second motion component is rotated about the second axle and relative to the first motion component, the first axle, the linking member, and the third motion component.

In one embodiment of the disclosure, when the included angle between the first motion component and the second motion component is decreased from the second angle to the first angle, the second motion component, the linking member, the second axle, and the third motion component are simultaneously rotated about the first axle and relative to the first motion component.

In one embodiment of the disclosure, an axial direction of the first axle is parallel to an axial direction of the second axle.

In one embodiment of the disclosure, the hinge module includes a first gear and a second gear, wherein the first gear is disposed on the first axle, the second gear is disposed on the second axle and engaged with the first gear, and when the included angle between the first motion component and the second motion component is decreased from the second angle to the first angle, the third motion component is rotated relative to the second motion component by driving of the first gear and the second gear.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component is the second angle, the included angle between the first motion component and third motion component is the third angle.

A hinge module of the disclosure includes a first motion component, a second motion component, a third motion component, an axle module, and a linking member. The second motion component is connected between the first motion component and the third motion component and has a pushing portion and a pulling portion. The axle module includes a first axle and a second axle. The linking member is pivoted to the first motion component by the first axle, the second motion component and the linking member are pivoted to the third motion component by the second axle, and the linking member is adapted to move along the axle module. When the second motion component is rotated relative to the first motion component from a first operation state to a second operation state, the second motion component props against the linking member by the pushing portion to drive the third motion component to be synchronously rotated relative to the first motion component by the linking member, and to drive the linking member to move along the axle module. When the second motion component continues rotating relative to the first motion component from the second operation state, the pushing portion is separated from the linking member along with movement of the linking member. When the second motion component continues rotating relative to the first motion component from the second operation state, the pulling portion is in contact with the linking member along with rotation of the second motion component. When the second motion component continues rotating relative to the first motion component from the second operation state to the first operation state, the second motion component props against the linking member by the pulling portion to drive the third motion component to be synchronously rotated relative to the first motion component by the linking member, and to drive the linking member to move along the axle module and return.

In one embodiment of the disclosure, when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, when the included angle between the first motion component and the second motion component is increased from the first angle to the second angle or decreased from the second angle to the first angle, the second motion component, the linking member, the second axle, and the third motion component are simultaneously rotated about the first axle and relative to the first motion component.

In one embodiment of the disclosure, when the included angle between the first motion component and the second motion component is increased from the second angle to the third angle or decreased from the third angle to the second angle, the second motion component is rotated about the second axle and relative to the first motion component, the first axle, the linking member, and the third motion component.

In one embodiment of the disclosure, an axial direction of the first axle is parallel to an axial direction of the second axle, the linking member is slidably disposed on the first axle and the second axle along the axial direction of the first axle and the axial direction of the second axle.

In one embodiment of the disclosure, the linking member has a guiding slot, the first axle has a column body thereon, an extending direction of the guiding slot is inclined with respect to the axial direction of the first axle, the column body is located in the guiding slot, and when the linking member is rotated relative to the first axle, the column body is moved along the guiding slot to drive the linking member to move along the first axle.

In one embodiment of the disclosure, the guiding slot has a first end and a second end opposite to each other, when the included angle between the first motion component and the second motion component is increased from the first angle to the second angle, the column body is moved from the first end toward the second end, and the second end blocks the column body to stop the third motion component from continuing to rotate relative to the first motion component.

In one embodiment of the disclosure, a length of the pushing portion along the axial direction of the second axle is greater than or equal to a stroke length of the guiding slot along the axial direction of the first axle.

In one embodiment of the disclosure, a stroke length of the guiding slot along the axial direction of the first axle is greater than a contact length between the pushing portion and the linking member along the axial direction of the second axle.

In one embodiment of the disclosure, the hinge module includes a first gear and a second gear, wherein the first gear is disposed on the first axle, the second gear is disposed on the second axle and engaged with the first gear, and when the included angle between the first motion component and the second motion component is increased from the first angle to the second angle or decreased from the second angle to the first angle, the third motion component is rotated relative to the second motion component by the operation of first gear and second gear.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component is the second angle, the included angle between the first motion component and third motion component is the third angle.

In one embodiment of the disclosure, the second motion component has a stop portion, when the included angle between the first motion component and the second motion component is increased to the third angle, the stop portion leans against the linking member to stop the second motion component from continuing to rotate relative to the first motion component.

In one embodiment of the disclosure, a length of the pulling portion along the axial direction of the second axle is greater than a sum of lengths of the pushing portion and the stop portion along the axial direction of the second axle.

In one embodiment of the disclosure, the linking member has a contact portion, the contact portion is configured to contact with the pulling portion, and a length of the contact portion along the axial direction of the second axle is greater than the length of the pulling portion along the axial direction of the second axle.

An assembling method of the disclosure includes following steps. A first axle is passed through a linking member, wherein the linking member has a guiding slot. A column body is attached on the first axle through the guiding slot, so that the column body is located in the guiding slot.

In one embodiment of the disclosure, the assembling method further includes following steps. The linking member is pivoted to a first motion component by the first axle.

In one embodiment of the disclosure, the assembling method further includes following steps. A second axle is passed through the linking member. The linking member and a second motion component are pivoted to a third motion component by the second axle, wherein the second motion component has a pushing portion, the linking member is adapted to move along the first axle and the second axle to be in contact with or separated from the pushing portion.

In one embodiment of the disclosure, the assembling method further includes following steps. A second axle is passed through the linking member. The linking member and the second motion component are pivoted to the third motion component by the second axle, wherein the second motion component has a stop portion and a pulling portion, the second motion component is adapted to rotate so that the stop portion is in contact with or separated from the linking member, and the second motion component is adapted to rotate so that the pulling portion is in contact with or separated from the linking member.

Based on the above, with respect to the hinge module of the present embodiment, in process of increasing the included angle between the first motion component (connected to a docking station, for example) and the second motion component (connected to an electronic device, for example) from the first angle to the second angle, the second motion component props against the linking member by the pushing portion, such that the third motion component (connected to the foot stand, for example) is driven to rotate relative to the first motion component so as to flip over. Hence, the foot stand connected to the third motion component supports the docking station and the electronic device, and the linking member is driven to move along the first axle and the second axle in this process. After the included angle between the first motion component and the second motion component exceeds the second angle, the linking member is moved to be separated from the pushing portion of the second motion component, so the third motion component is not driven by the second motion component. At this time, the second motion component can continuously flip over relative to the first motion component so as to increase the included angle between the first motion component and the second motion component to the third angle. Accordingly, the tilt angle of the second motion component and the electronic device connected to the same can be freely and independently adjusted between the second angle and the third angle and is not limited by the third motion component and the foot stand connected to the same.

In order to make the aforementioned and other features and advantages of the disclosure more comprehensible, embodiments accompanying figures are described in detail below.

BRIEF DESCRIPTION OF THE DRAWINGS

FIG. 6A to FIG. 6E are side views of the hinge module corresponding to FIG. 5A to FIG. 5E, respectively.

DESCRIPTION OF THE EMBODIMENTS

Figure 1:
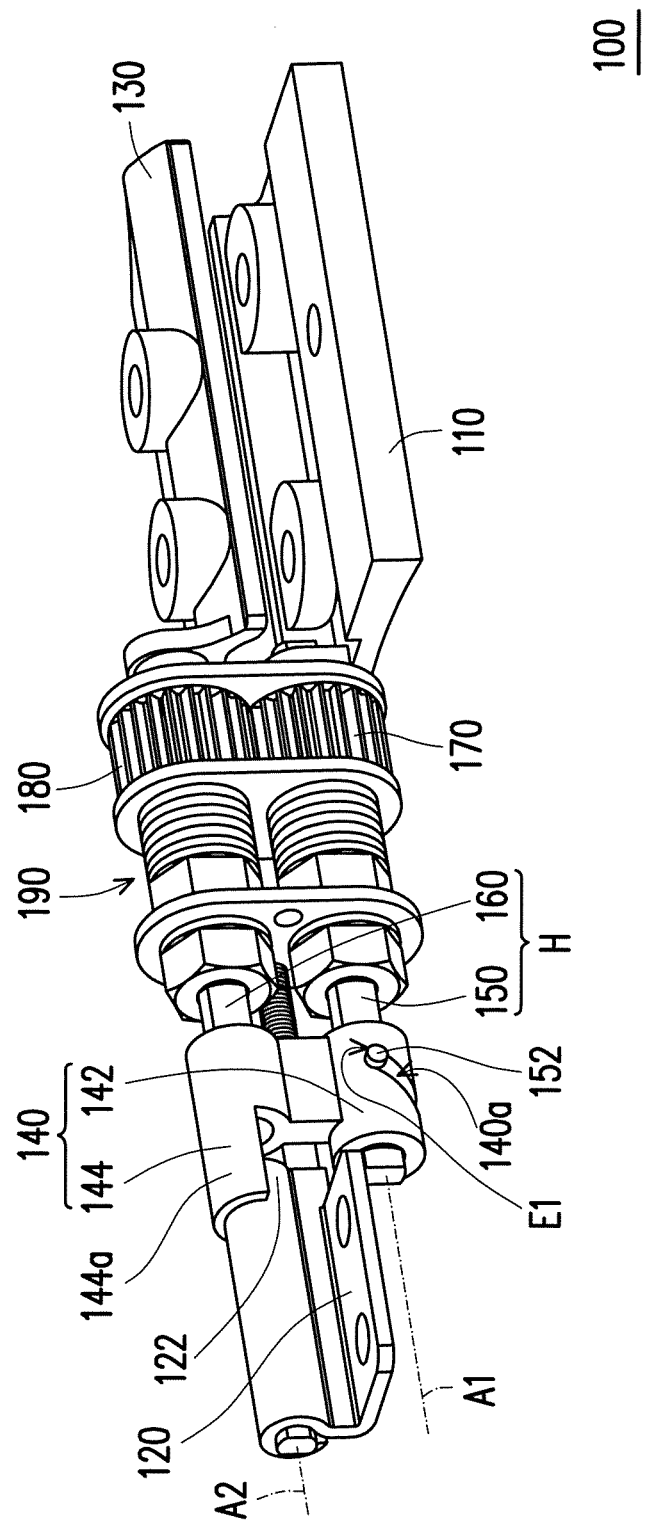
FIG. 1 is a three dimensional view of a hinge module according to an embodiment of the disclosure.
Figure 2:
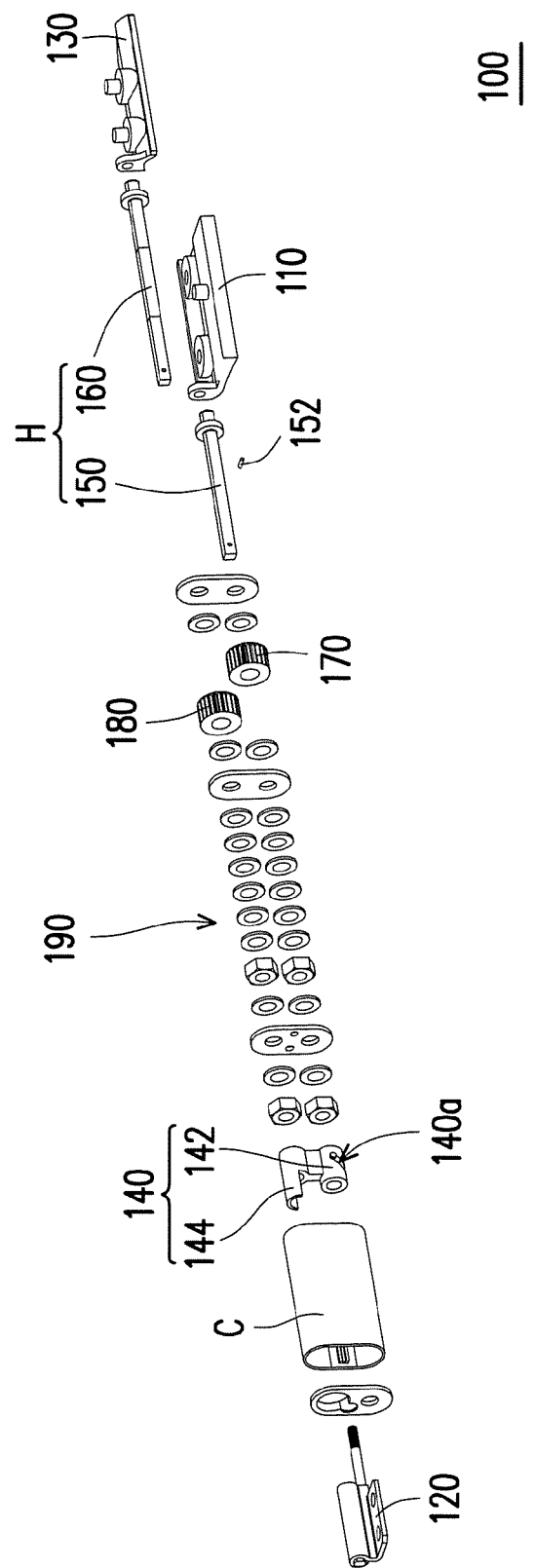
FIG. 2 is an exploded view of the hinge module in FIG. 1.

FIG. 1 is a three dimensional view of a hinge module according to an embodiment of the disclosure. FIG. 2 is an exploded view of the hinge module in FIG. 1. Referring to FIG. 1 and FIG. 2, a hinge module 100 of the present embodiment includes a first motion component 110, a second motion component 120, a third motion component 130, an axle module H, and a linking member 140. The axle module H includes a first axle 150 and a second axle 160. The linking member 140 is pivoted to the first motion component 110 about an axial direction A1 of the first axle 150 by the first axle 150, the second motion component 120 and the linking member 140 are pivoted to the third motion component 130 about an axial direction A2 of the second axle 160 by the second axle 160, so the second motion component 120 is connected between the first motion component 110 and the third motion component 130. The axial direction A1 of the first axle 150 is parallel to the axial direction A2 of the second axle 160. In the present embodiment, the first motion component 110, the second motion component 120, and the third motion component 130 all belong to a frame and are configured to respectively connect with a docking station, an electronic device, and a foot stand, for example.

In detail, the linking member 140 includes a first sliding portion 142 and a second sliding portion 144 and is movably and rotatably sleeved on the first axle 150 and the second axle 160 by the first sliding portion 142 and the second sliding portion 144, respectively. Namely, the linking member 140 is slidably disposed on the first axle 150 and the second axle 160 along the axial direction A1 of the first axle 150 and the axial direction A2 of the second axle 160, so as to be adapted to move along the first axle 150 and the second axle 160 and to be adapted to rotate relative to the first axle 150 or the second axle 160.

Figure 3:
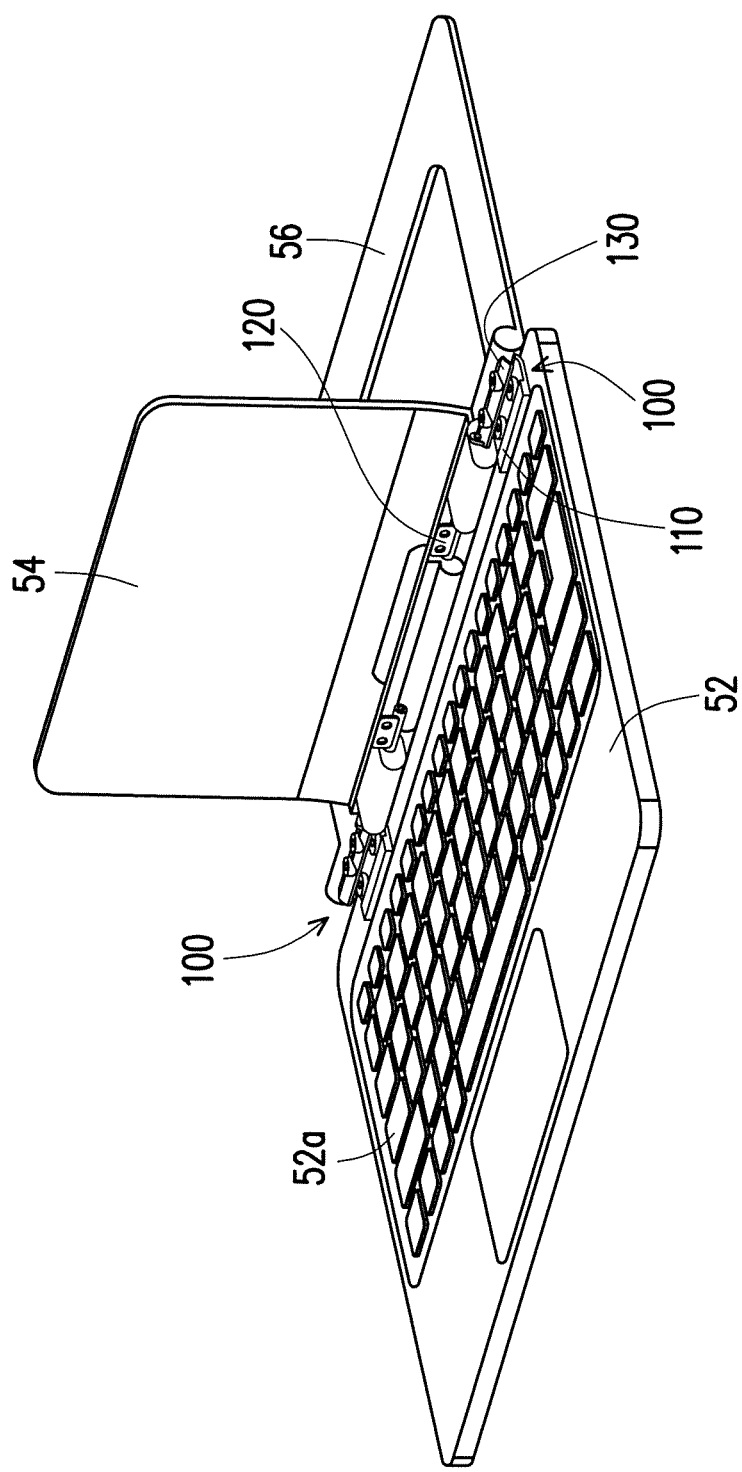
FIG. 3 is a schematic view depicting the hinge module in FIG. 1 being installed in a docking station.

FIG. 3 is a schematic view depicting the hinge module in FIG. 1 being installed in a docking station. The hinge module 100 of the present embodiment may be installed in a docking station 52 as shown in FIG. 3, wherein the first motion component 110 is connected to the docking station 52, the second motion component 120 is connected to a support plate 54, and the third motion component 130 is connected to a foot stand 56. The support plate 54 is configured so that an electronic device (such as a tablet PC) is supported thereon. The docking station 52 has an input interface 52a (such as a keyboard), and inputs are entered into the electronic device via the input interface 52a. The foot stand 56 is configured to support the docking station 52 and the electronic device. It should be noted here, the support plate 54 and the foot stand 56 all flip over with respect to the docking station 52 in FIG. 3, but the hinge module 100 in FIG. 1 is corresponding to a state that the support plate 54 and the foot stand 56 all are closed respect to the docking station 52.

Figure 4A:
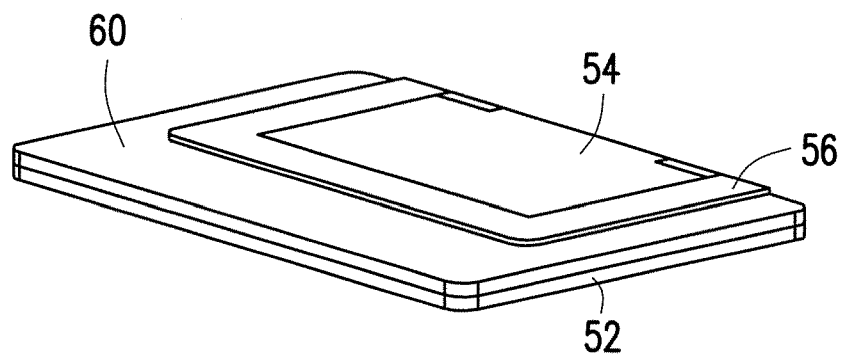
FIG. 4A to FIG. 4E are schematic views depicting actuation process of the docking station, a support plate, and a foot stand in FIG. 1.
Figure 4B:
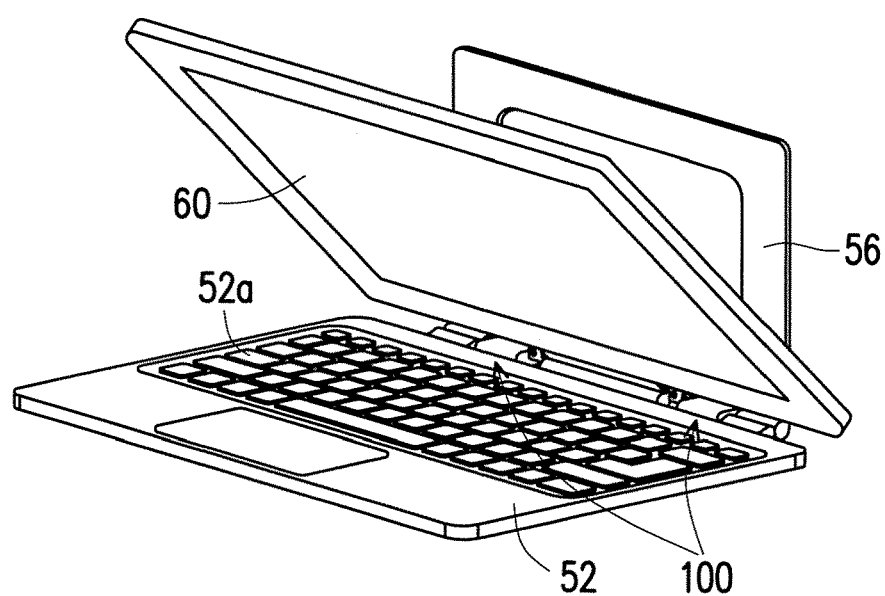
Figure 4C:
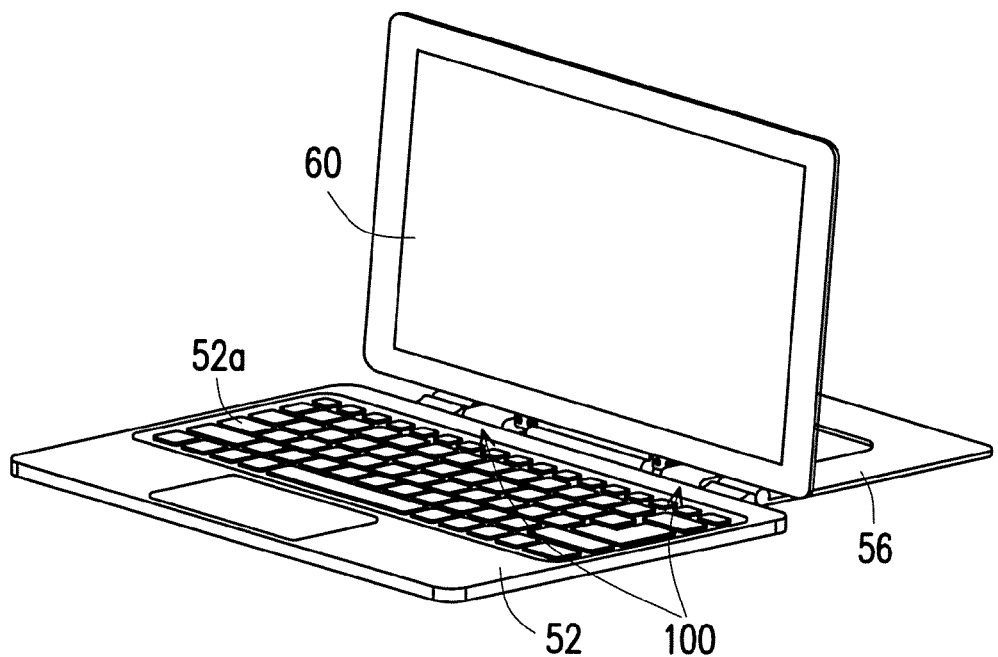
Figure 4D:
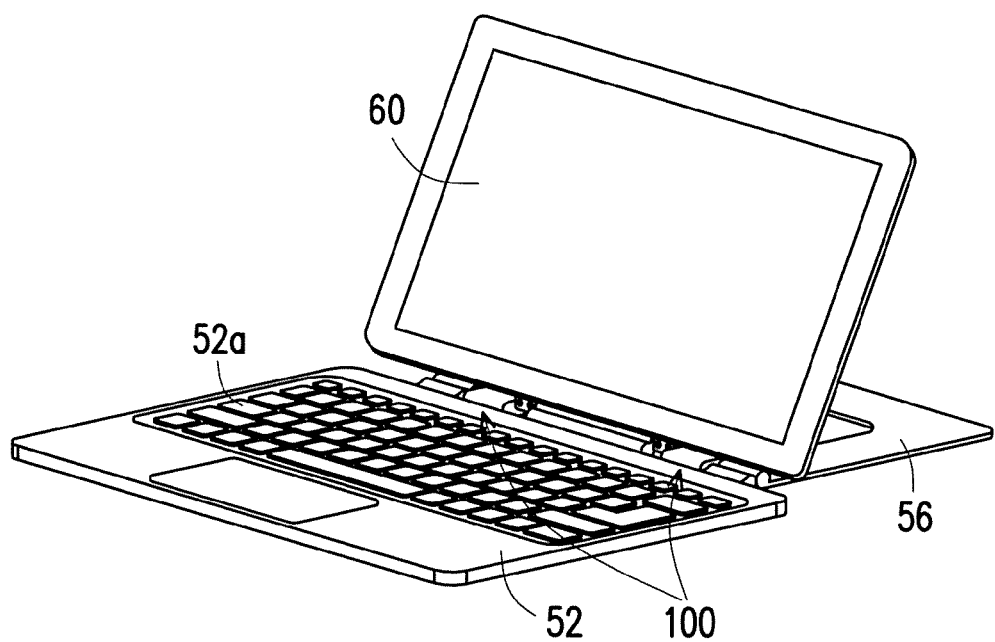
Figure 4E:
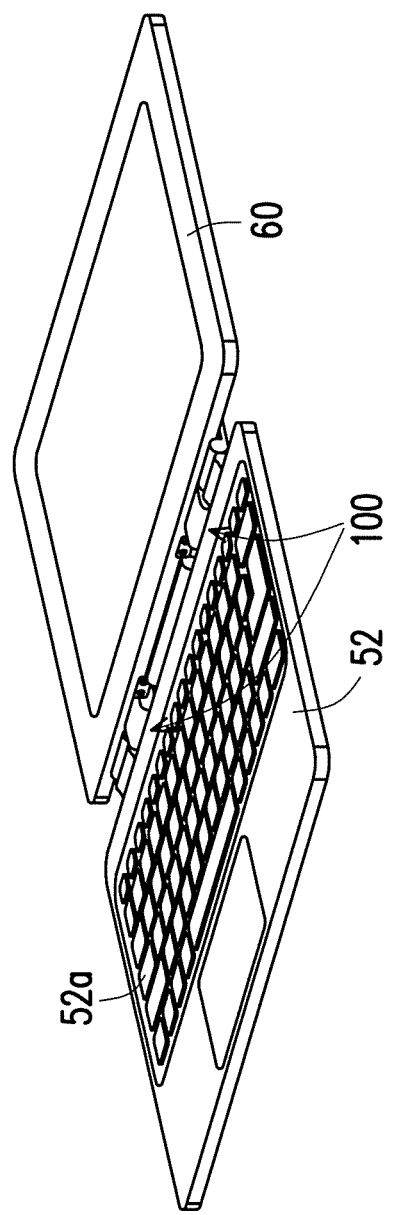
Figure 5A:
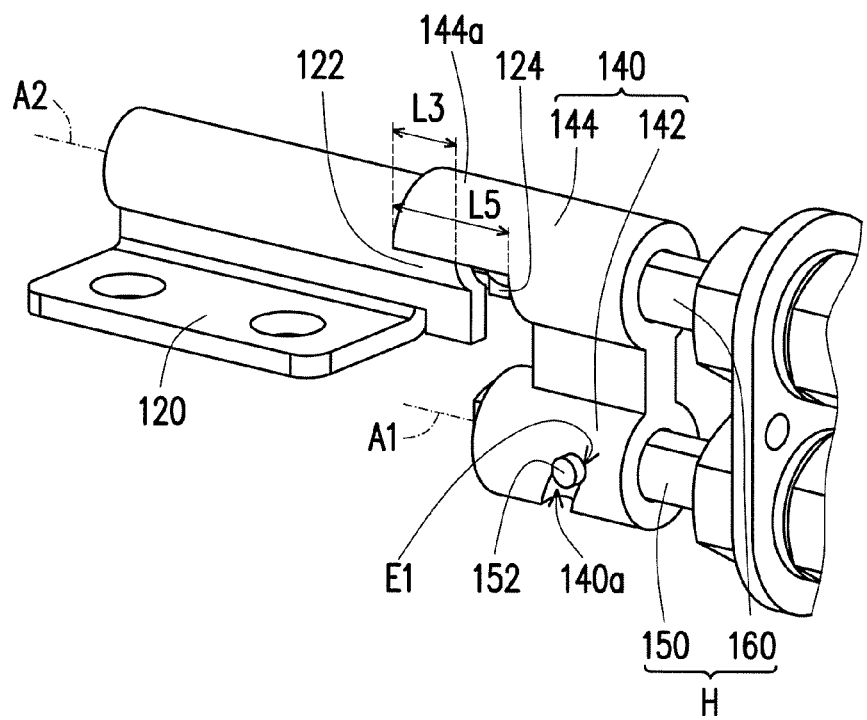
FIG. 5A to FIG. 5E are partial three dimensional views of the hinge module corresponding to FIG. 4A to FIG. 4E, respectively.
Figure 5B:
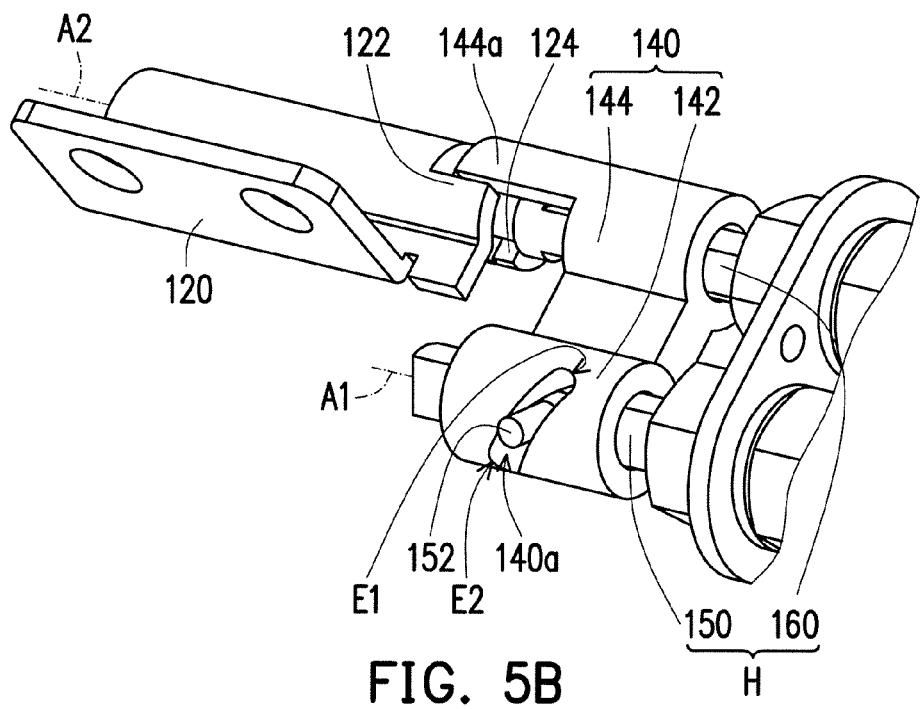
Figure 5C:
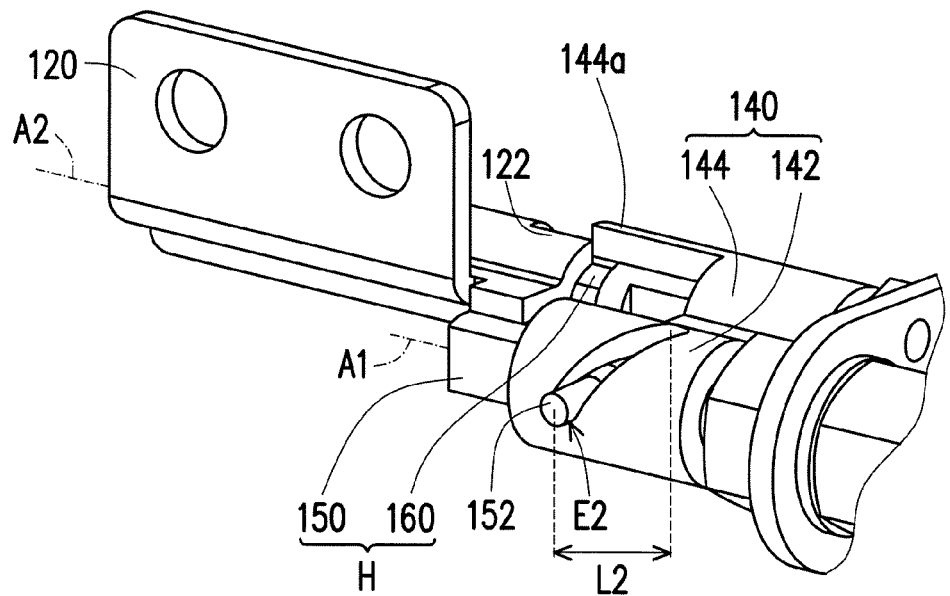

Referring to FIG. 1, the second motion component 120 has a pushing portion 122, and the pushing portion 122 is configured to drive the linking member 140 to actuate, which is illustrated with accompanying drawings as followings. FIG. 4A to FIG. 4E are schematic views depicting actuation process of the docking station, the support plate, and the foot stand in FIG. 1. FIG. 5A to FIG. 5E are partial three dimensional views of the hinge module corresponding to FIG. 4A to FIG. 4E, respectively. FIG. 6A to FIG. 6E are side views of the hinge module corresponding to FIG. 5A to FIG. 5E, respectively. In a closed state shown in FIG. 4A, an included angle between the first motion component 110 and the second motion component 120 is a first angle (depicted as 0 degree) as shown in FIG. 6A. At this time, an included angle between the first motion component 110 and the third motion component 130 is also the first angle (depicted as 0 degree). When the user applies force on the electronic device 60 disposed on the support plate 54 shown in FIG. 4A to make the second motion component 120 rotate from a first operation state shown in FIG. 5A to a second operation state shown in FIG. 5C, the second motion component 120 connected to the support plate 54 rotates relative to the first motion component 110 (illustrated in FIG. 6A to FIG. 6C) and about the axial direction A1 of the first axle 150 as shown in FIGS. 5A to 5C, so that the included angle between the first motion component 110 and the second motion component 120 is increased from the first angle (shown as 0 degree in FIG. 6A) to a second angle (shown as 90 degrees in FIG. 6C) as shown in FIG. 6A to FIG. 6C. In addition, the second motion component 120 props against the second sliding portion 144 of the linking member 140 by the pushing portion 122 to drive the third motion component 130 to be synchronously rotated relative to the first motion component 110 (illustrated in FIG. 6A to FIG. 6C) by the linking member 140, and to drive the linking member 140 to move along the axial direction A1 of the first axle 150 and the axial direction A2 of the second axle 160 relative to the second motion component 120 from a position shown in FIG. 5A to a position shown in FIG. 5C.

In the process of increasing the included angle between the first motion component 110 and the second motion component 120 from the first angle to the second angle as mentioned above, the second motion component 120, the linking member 140, the second axle 160, and the third motion component 130 are simultaneously rotated about the first axle 150 and relative to the first motion component 110. Hence, the electronic device 60 and the foot stand 56 simultaneously flip over with respect to the docking station 52 as shown in FIG. 4A to FIG. 4C, and the foot stand 56 can support the docking station 52 and the electronic device 60. In the present embodiment, when the included angle between the first motion component 110 and the second motion component 120 is the second angle (shown as 90 degrees), the included angle between the first motion component 110 and third motion component 130 is a third angle (shown as 180 degrees) as shown in FIG. 6C.

When the user continues applying force on the electronic device 60 shown in FIG. 4C, the second motion component 120 shown in FIG. 5C continues rotating relative to the first motion component 110 and about the axial direction A2 of the second axle 160 from the second operation state (illustrated in FIG. 6C) so that the included angle between the first motion component 110 and the second motion component 120 becomes greater than the second angle (depicted as 90 degrees) shown in FIG. 6C. In addition, the pushing portion 122 of the second motion component 120 is separated from the linking member 140 along with movement of the linking member 140, so that the second motion component 120 stops driving the third motion component 130 to synchronously rotate relative to the first motion component 110.

Figure 5D:
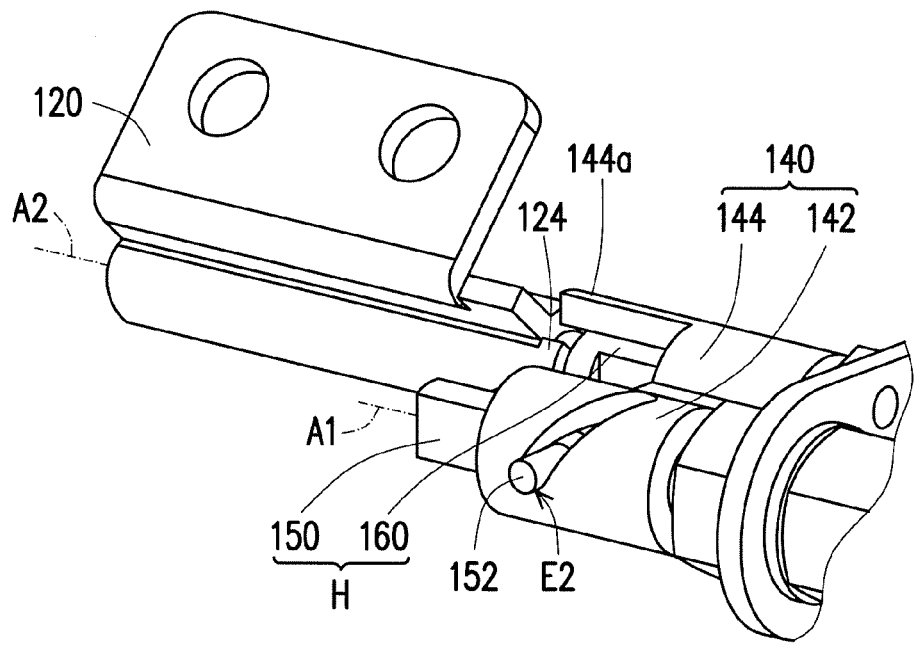
Figure 5E:
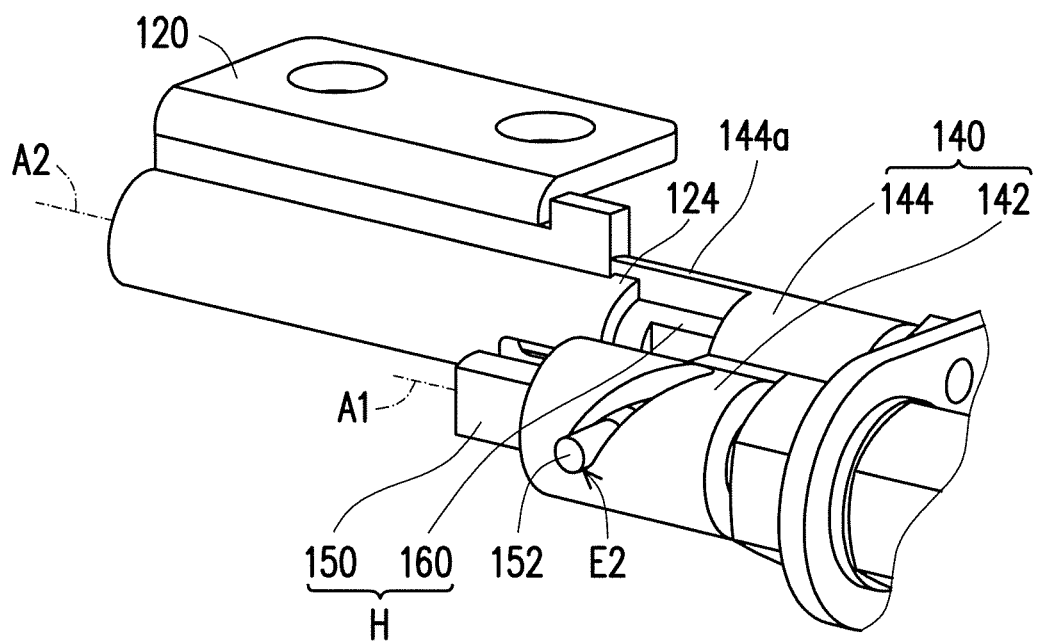

When the second motion component 120 in FIG. 5C continues rotating relative to the first motion component 110 by force of the user applying on the electronic device 60 from the second operation state (illustrated in FIG. 6C) to the third operation state shown in FIG. 5E in order to increase the included angle between the first motion component 110 and the second motion component 120 from the second angle (shown as 90 degrees in FIG. 6C) to a third angle (shown as 180 degrees in FIG. 6E) as shown in FIG. 6C to FIG. 6E, since the second motion component 120 stops driving the third motion component 130, the included angle between the first motion component 110 and the third motion component 130 is unchanged.

In the process of increasing the included angle between the first motion component 110 and the second motion component 120 from the second angle to the third angle as mentioned above, the second motion component 120 is rotated about the second axle 160 and relative to the first motion component 110, the first axle 150, the linking member 140, and the third motion component 130. Hence, under the circumstance that the foot stand 56 is not driven, the electronic device 60 continues rotating with respect to the docking station 52 as shown in FIG. 4C to FIG. 4E in order to increase an included angle between the electronic device 60 and the docking station 52.

By the aforementioned disposition method, the tilt angle of the second motion component 120 and the electronic device 60 connected to the same can be freely and independently adjusted between the second angle and the third angle and is not limited by the third motion component 130 and the foot stand 56 connected to the same. In addition, since the hinge module 100 has three motion components (such as the first motion component 110, the second motion component 120, and the third motion component 130) configured to respectively connect with the docking station 52, the electronic device 60, and the foot stand 56, the foot stand 56 does not need to be mounted on the electronic device 60. Hence, the size of the foot stand 56 is not limited by the design of the electronic device 60, so that the foot stand 56 may have a larger supporting area, in order to prevent discomfort caused when the foot stand 56 is placed on the thigh of the user.

The process of closing the electronic device 60 and the foot stand 56 toward the docking station 52 and the corresponding actuation process of the hinge module 100 are described with accompanying drawings as followings. FIG. 7A to FIG. 7E are partial three dimensional views at another angle of the hinge module corresponding to FIG. 5A to FIG. 5E, respectively. The second motion component 120 has a pulling portion 126, as shown in FIG. 7E. When the user applies force on the electronic device 60 shown in FIG. 4E, the second motion component 120 is rotated about the axial direction A2 of the second axle 160 and relative to the first motion component 110 (illustrated in FIG. 6E to FIG. 6C) from the third operation state to the second operation state as shown in FIG. 7E to FIG. 7C so as to decrease the included angle between the first motion component 110 and the second motion component 120 from the third angle (shown as 180 degrees in FIG. 6E) to the second angle (shown as 90 degrees in FIG. 6C) as shown in FIG. 6E to FIG. 6C. In this process, since the second motion component 120 does not drive the third motion component 130, the included angle between the first motion component 110 and the third motion component 130 is fixed (shown as 180 degrees in FIG. 6E to FIG. 6C).

In the process of decreasing the included angle between the first motion component 110 and the second motion component 120 from the third angle to the second angle as mentioned above, the second motion component 120 is rotated about the second axle 160 and relative to the first motion component 110, the first axle 150, the linking member 140, and the third motion component 130. Hence, under the circumstance that the foot stand 56 is not driven, the electronic device 60 is rotated with respect to the docking station 52 as shown in FIG. 4E to FIG. 4C in order to decrease the included angle between the electronic device 60 and the docking station 52. To be more specific, the second motion component 120 of the present embodiment is sleeved on the second axle 160 as a single unit and a torque is generated therebetween. This torque is smaller than a torque provided by a torsion assembly 190 (indicated in FIG. 1 and FIG. 2) of the hinge module 100, so as to prevent the torque between the second motion component 120 and the second axle 160 exceeding and unexpectedly driving the third motion component 130 in the process of decreasing the included angle between the first motion component 110 and the second motion component 120 from the third angle to the second angle as aforementioned.

When the user continues applying force on the electronic device 60 shown in FIG. 4C, the second motion component 120 shown in FIG. 7C continues rotating relative to the first motion component 110 from the second operation state (illustrated in FIG. 6C) so that the included angle between the first motion component 110 and the second motion component 120 becomes smaller than the second angle (depicted as 90 degrees) shown in FIG. 6C. In addition, the pulling portion 126 of the second motion component 120 is in contact with the second sliding portion 144 of the linking member 140 along with rotation of the second motion component 120, so that the second motion component 120 starts driving the third motion component 130 to rotate synchronously by the linking member 140.

Figure 7A:
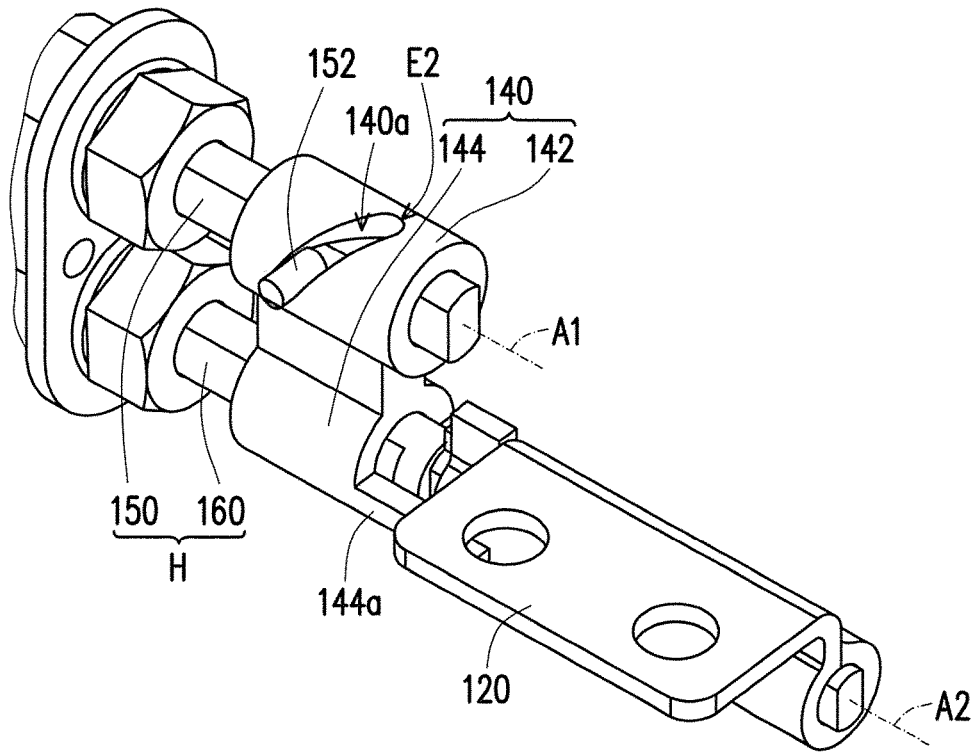
FIG. 7A to FIG. 7E are partial three dimensional views at another angle of the hinge module corresponding to FIG. 5A to FIG. 5E, respectively.
Figure 7B:
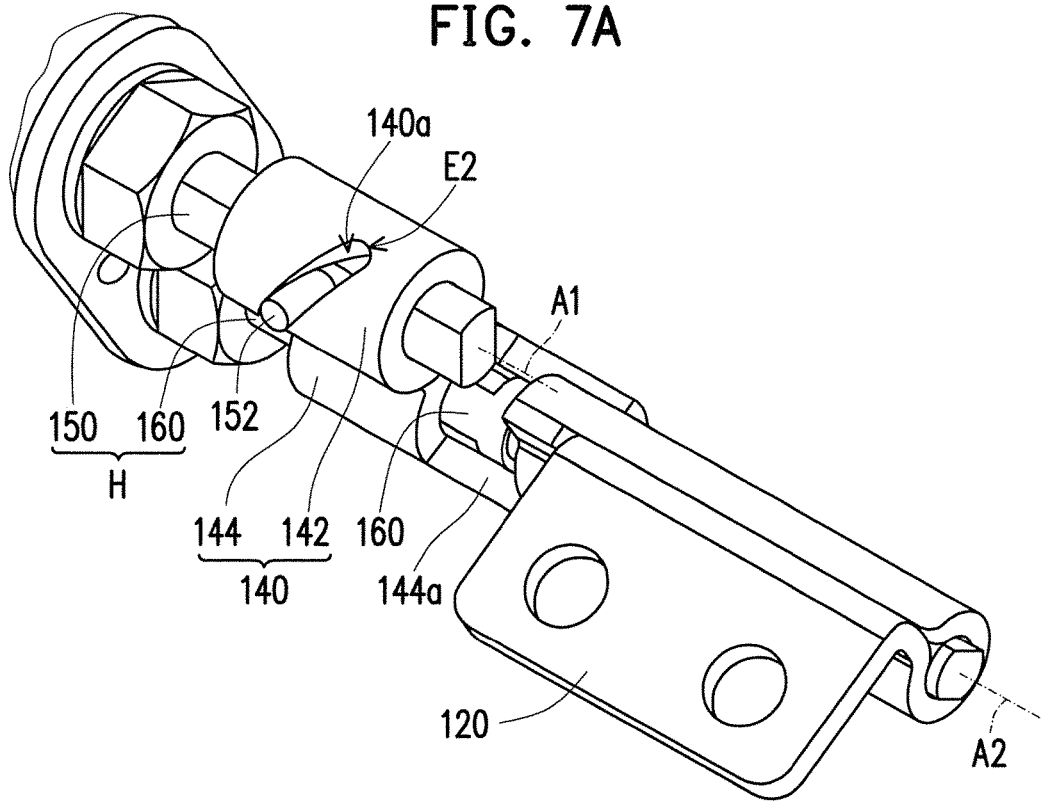
Figure 7C:
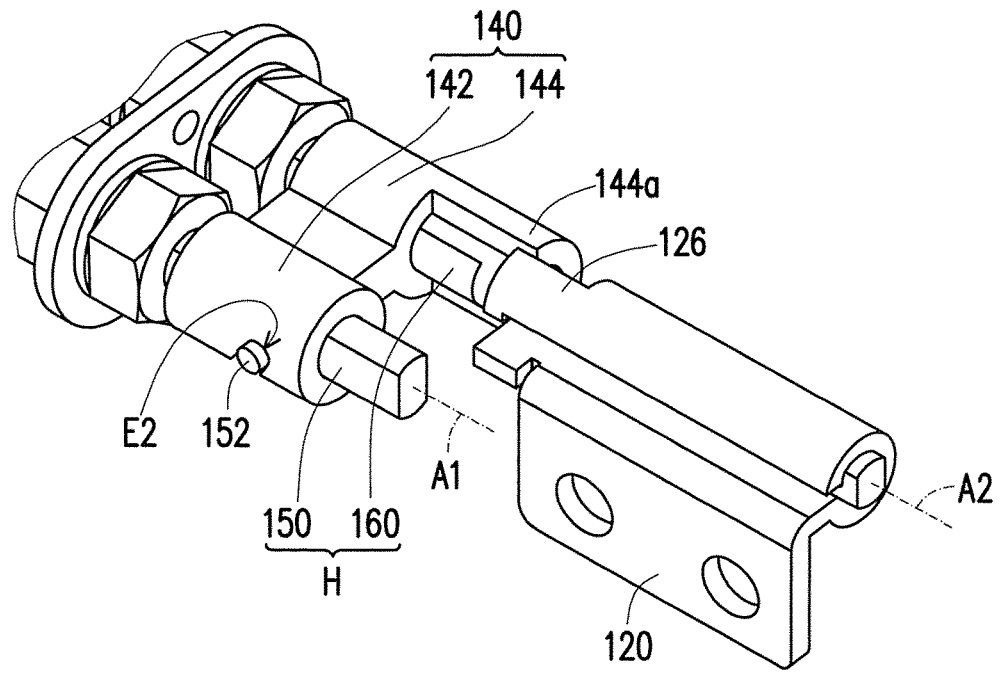
Figure 7D:
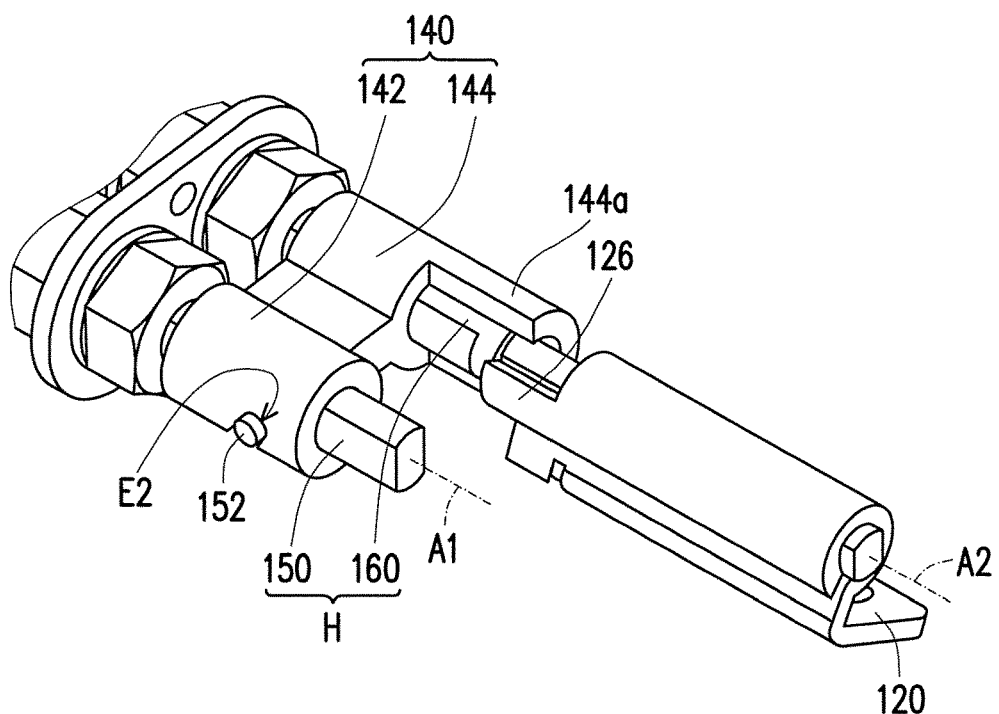
Figure 7E:
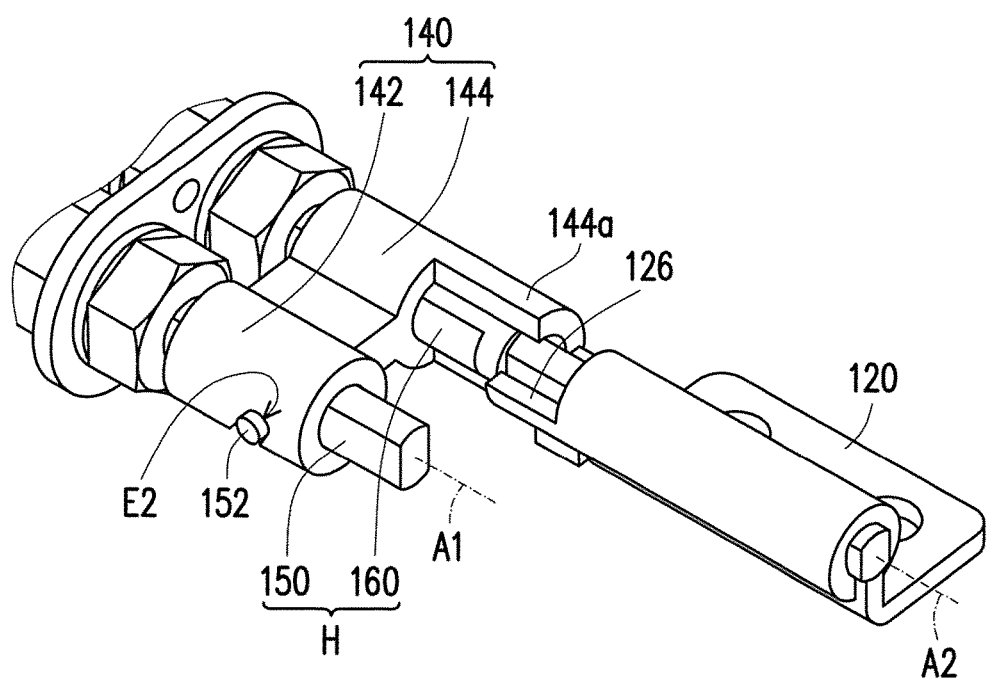

When the second motion component 120 in FIG. 7C continues rotating relative to the first motion component 110 by force of the user applying on the electronic device 60 from the second operation state (illustrated in FIG. 6C) to the first operation state in order to decrease the included angle between the first motion component 110 and the second motion component 120 from the second angle (shown as 90 degrees in FIG. 6C) to the first angle (shown as 0 degree in FIG. 6A) as shown in FIG. 6C to FIG. 6A, the second motion component 120 props against the second sliding portion 144 of the linking member 140 by the pulling portion 126 to drive the third motion component 130 to be synchronously rotated relative to the first motion component 110 by the linking member 140 (illustrated in FIG. 6C to FIG. 6A), and to drive the linking member 140 to move along the axial direction A1 of the first axle 150 and the axial direction A2 of the second axle 160 relative to the second motion component 120 and return to the position shown in FIG. 7A.

In the process of decreasing the included angle between the first motion component 110 and the second motion component 120 from the second angle to the first angle as mentioned above, the second motion component 120, the linking member 140, the second axle 160, and the third motion component 130 are simultaneously rotated about the first axle 150 and relative to the first motion component 110. Hence, the electronic device 60 and the foot stand 56 are closed toward the docking station 52 at the same time as shown in FIG. 4C to FIG. 4A.

Referring to FIG. 6A to FIG. 6E, the first motion component 110 has a reference surface 110a, the second motion component 120 has a reference surface 120a, and the third motion component 130 has a reference surface 130a. Based on above, the included angle between the first motion component 110 and the second motion component 120 is an included angle between the reference surface 110a and the reference surface 120a, and the included angle between the first motion component 110 and the third motion component 130 is an included angle between the reference surface 110a and the reference surface 130a.

The method of driving the linking member 140 of the hinge module 100 to move in the present embodiment is described in detail as followings. Referring to FIG. 1, the linking member 140 of the present embodiment has a guiding slot 140a, and the first axle 150 has a column body 152 thereon, which is corresponding to the guiding slot 140a. An extending direction of the guiding slot 140a is inclined with respect to the axial direction A1 of the first axle 150, and the column body 152 is located in the guiding slot 140a. Accordingly, when the linking member 140 is rotated relative to the first axle 150, the column body 152 is moved along the guiding slot 140a to drive the linking member 140 to move along the axial direction A1 of the first axle 150. In other embodiments, the linking member 140 is driven to move along the axial direction A1 of the first axle 150 by other appropriate structures and methods, the disclosure is not limited thereto.

Furthermore, the guiding slot 140a of the present embodiment has a first end E1 and a second end E2 opposite to each other as shown in FIG. 5B. When the included angle between the first motion component 110 and the second motion component 120 is increased from the first angle to the second angle as aforementioned, the column body 152 is moved from the first end E1 toward the second end E2, and the second end E2 blocks the column body 152 as shown in FIG. 5C to FIG. 5E, so as to stop the third motion component 130 from continuing to rotate relative to the first motion component 110 in the actuation process shown in FIG. 6C to FIG. 6E. Therefore, the angle that the foot stand 56 flips over with respect to the docking station 52 does not exceed the third angle.

Referring to FIG. 5A, the second motion component 120 of the present embodiment has a stop portion 124. When the included angle between the first motion component 110 and the second motion component 120 is increased to the third angle as aforementioned, the stop portion 124 leans against the second sliding portion 144 of the linking member 140 as shown in FIG. 5E to stop the second motion component 120 from continuing to rotate relative to the first motion component 110, so that the angle that the electronic device 60 flips over with respect to the docking station 52 does not exceed the third angle.

Referring to FIG. 1 and FIG. 2, in the present embodiment, the hinge module 100 further includes a first gear 170 and a second gear 180. The first gear 170 is disposed on the first axle 150, the second gear 180 is disposed on the second axle 160 and engaged with the first gear 170. In the process of increasing the included angle between the first motion component 110 and the second motion component 120 from the first angle to the second angle or decreasing the included angle between the first motion component 110 and the second motion component 120 from the second angle to the first angle, except that the third motion component 130 and the second motion component 120 are simultaneously rotated about the axial direction A1 of the first axle 150 and relative to the first motion component 110, the third motion component 130 is also rotated about the axial direction A2 of the second axle 160 and relative to the second motion component 120 by driving of the first gear 170 and the second gear 180. Accordingly, an amount of rotation of the third motion component 130 is greater than an amount of rotation of the second motion component 120. To be more specific, in the present embodiment, a gear ratio between the first gear 170 and the second gear 180 is 1:1. Therefore, when the included angle between the first motion component 110 and the second motion component 120 is increased from 0 degree (the first angle) to 90 degrees (the second angle) as shown in FIG. 6A to FIG. 6C, the included angle between the first motion component 110 and the third motion component 130 is increased from 0 degree (the first angle) to 180 degrees (the third angle) as shown in FIG. 6A to FIG. 6C. In addition, when the included angle between the first motion component 110 and the second motion component 120 is decreased from 90 degrees (the second angle) to 0 degree (the first angle) as shown in FIG. 6C to FIG. 6A, the included angle between the first motion component 110 and the third motion component 130 is decreased from 180 degrees (the third angle) to 0 degree (the first angle) as shown in FIG. 6C to FIG. 6A.

Figure 8:
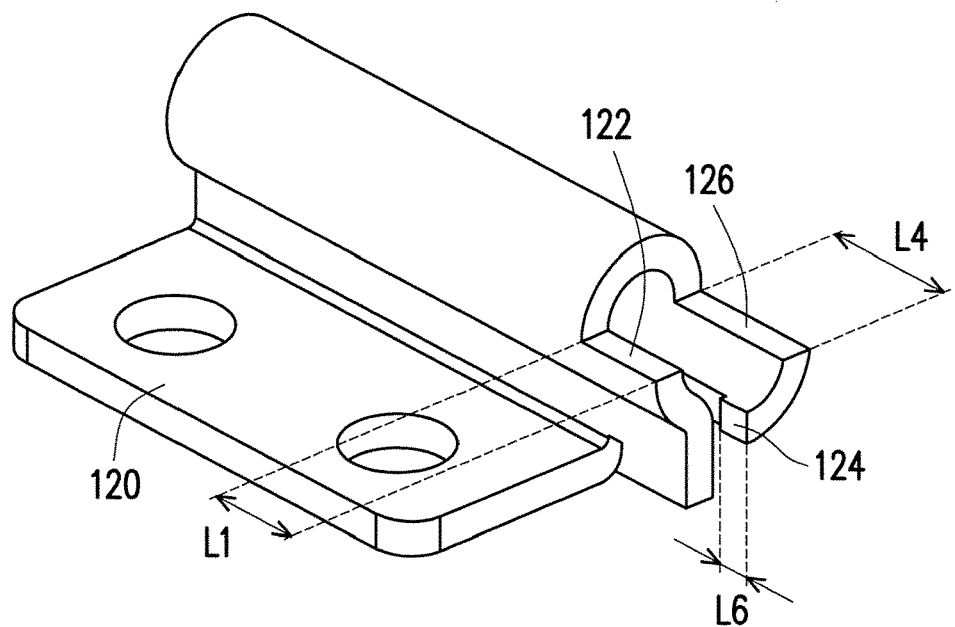
FIG. 8 is a three dimensional view of the second motion component in FIG. 1.

In order to allow the hinge module 100 to smoothly complete the actuations in FIG. 5A to FIG. 5E and FIG. 7E to FIG. 7A, the dimensions of the second motion component 120 and the linking member 140 are designed as followings. FIG. 8 is a three dimensional view of the second motion component in FIG. 1. Referring to FIG. 5A, FIG. 5C, and FIG. 8, in the present embodiment, a length L1 (indicated in FIG. 8) of the pushing portion 122 along the axial direction A2 of the second axle 160 is greater than or equal to a stroke length L2 (indicated in FIG. 5C) of the guiding slot 140a along the axial direction A1 of the first axle 150, the stroke length L2 (indicated in FIG. 5C) of the guiding slot 140a along the axial direction A1 of the first axle 150 is greater than a maximum contact length L3 (indicated in FIG. 5A) between the pushing portion 122 and the linking member 140 along the axial direction A2 of the second axle 160, and a length L4 shown in FIG. 8 of the pulling portion 126 along the axial direction A2 of the second axle 160 is greater than the sum of the length L1 of the pushing portion 122 along the axial direction A2 of the second axle 160 and a length L6 of the stop portion 124 along the axial direction A2 of the second axle 160. In addition, the second sliding portion 144 of the linking member 140 has a contact portion 144a as shown in FIG. 5A, the contact portion 144a is configured to contact with the pushing portion 122, the stop portion 124, and the pulling portion 126, and a length L5 (indicated in FIG. 5A) of the contact portion 144a along the axial direction A2 of the second axle 160 is greater than the length L4 (indicated in FIG. 8) of the pulling portion 126 along the axial direction A2 of the second axle 160.

Figure 9:
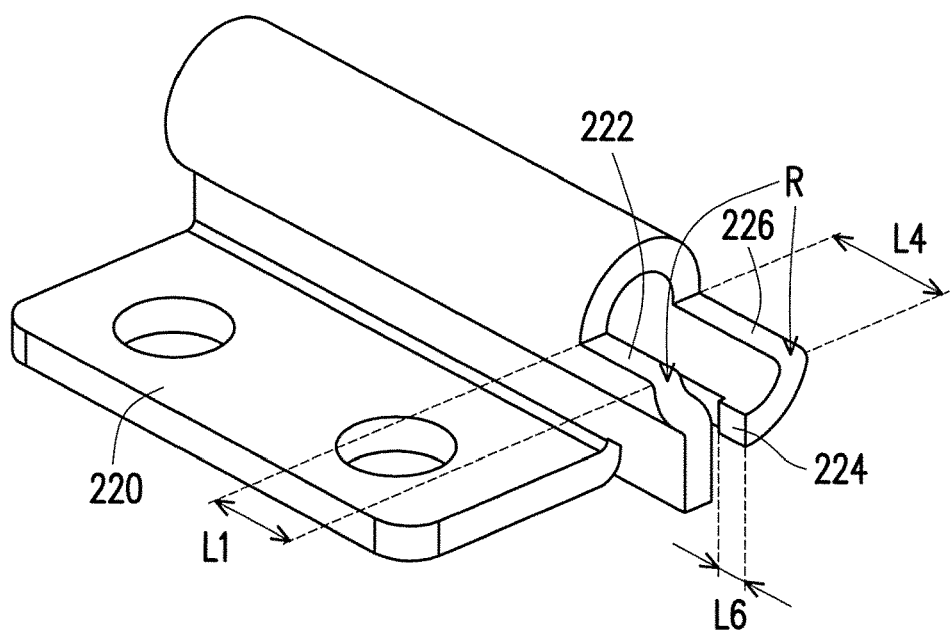
FIG. 9 is a three dimensional view of a second motion component in another embodiment of the disclosure.

FIG. 9 is a three dimensional view of a second motion component in another embodiment of the disclosure. The actuations of a pushing portion 222, a stop portion 224, and a pulling portion 226 of the second motion component 220 in FIG. 9 are similar to the actuations of the pushing portion 122, the stop portion 124, and the pulling portion 126, and will not be repeated. The differences between the second motion component 220 and the second motion component 120 are that round corners R are formed at edges of the pushing portion 222 and the pulling portion 226 of the second motion component 220, so that the relative movement between the second motion component 220 and the linking member is further performed more smoothly.

Figure 10:
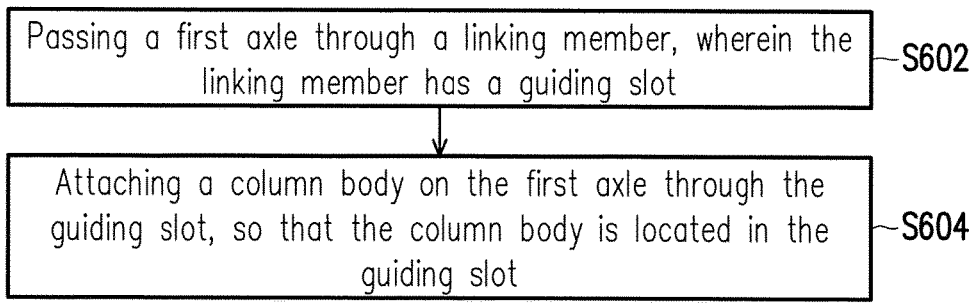
FIG. 10 is a flow chart of an assembling method of a first axle, a linking member, and a column body in FIG. 2.

The assembling method of some components of the hinge module 100 in the aforementioned embodiment is described as followings. FIG. 10 is a flow chart of an assembling method of the first axle, the linking member, and the column body in FIG. 2. Firstly, the first axle 150 is passed through the first sliding portion 142 of the linking member 140 as shown in FIG. 2, wherein the first sliding portion 142 of the linking member 140 has the guiding slot 140a (step S602). Next, the column body 152 shown in FIG. 2 is attached on the axle 150 through the guiding slot 140a, so that the column body 152 is located in the guiding slot 140a (step S604). In addition, the linking member 140 is pivoted to the first motion component 110 by the first axle 150, the second axle 160 is passed through the second sliding portion 144 of the linking member 140, and the linking member 140 and the second motion component 120 are pivoted to the third motion component 130 by the second axle 160. In the process of passing the first axle 150 and the second axle 160 through the linking member 140, the other components, such as the torsion assembly 190 and a cover C, are also assembled, wherein the cover C is configured to cover the torsion assembly 190 and the linking member 140.

In summary, with respect to the hinge module of the present embodiment, in process of increasing the included angle between the first motion component (connected to a docking station, for example) and the second motion component (connected to an electronic device, for example) from the first angle to the second angle, the second motion component props against the linking member by the pushing portion, such that the third motion component (connected to the foot stand, for example) is driven to rotate relative to the first motion component so as to flip over. Hence, the foot stand connected to the third motion component supports the docking station and the electronic device, and the linking member is driven to move along the first axle and the second axle in this process. After the included angle between the first motion component and the second motion component exceeds the second angle, the linking member is moved to be separated from the pushing portion of the second motion component, so the third motion component is not driven by the second motion component. At this time, the second motion component can continuously flip over relative to the first motion component so as to increase the included angle between the first motion component and the second motion component to the third angle. Accordingly, the tilt angle of the second motion component and the electronic device connected to the same can be freely and independently adjusted between the second angle and the third angle and is not limited by the third motion component and the foot stand connected to the same. In addition, since the hinge module has three motion components (such as the first motion component, the second motion component, and the third motion component) configured to respectively connect with the docking station, the electronic device, and the foot stand, the foot stand does not need to be mounted on the electronic device. Hence, the size of the foot stand is not limited by the design of the electronic device, so that the foot stand may have a larger supporting area, in order to prevent discomfort caused when the foot stand is placed on the thigh of the user.

Although the disclosure has been disclosed with reference to the aforesaid embodiments, they are not intended to limit the disclosure. It will be apparent to one of ordinary skill in the art that modifications and variations to the described embodiments may be made without departing from the spirit and the scope of the disclosure. Accordingly, the scope of the disclosure will be defined by the attached claims and not by the above detailed descriptions.

What is claimed is:

1. A hinge module, comprising:
a first motion component, a second motion component, and a third motion component, wherein the second motion component is connected between the first motion component and the third motion component and has a pushing portion; and
an axle module and a linking member, the axle module comprising a first axle and a second axle, the linking member being pivoted to the first motion component by the first axle, the second motion component and the linking member being pivoted to the third motion component by the second axle, and the linking member being adapted to move along an axial direction of the axle module,
wherein when the second motion component is rotated in a first direction relative to the first motion component from a first operation state to a second operation state, the pushing portion of the second motion component pushes against the linking member to drive the third motion component to be synchronously rotated more greatly than the second motion component in the first direction relative to the first motion component by the linking member, and to drive the linking member to move along the axial direction of the axle module,
when the second motion component continues rotating in the first direction relative to the first motion component from the second operation state, the pushing portion is separated from the linking member by movement of the linking member along the axial direction, and the second motion component is adapted to continue rotating in the first direction relative to the first motion component from the second operation state to a third operation state.

2. The hinge module as recited in claim 1, wherein when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

3. The hinge module as recited in claim 2, wherein when the included angle between the first motion component and the second motion component is increased from the first angle to the second angle, the second motion component, the linking member, the second axle, and the third motion component are simultaneously rotated about the first axle and relative to the first motion component.

4. The hinge module as recited in claim 2, wherein when the included angle between the first motion component and the second motion component is increased from the second angle to the third angle, the second motion component is rotated about the second axle and relative to the first motion component, the first axle, the linking member, and the third motion component.

5. The hinge module as recited in claim 1, wherein a first axial direction of the first axle is parallel to a second axial direction of the second axle, the linking member is slidably disposed on the first axle and the second axle along the first axial direction of the first axle and the second axial direction of the second axle.

6. The hinge module as recited in claim 2, wherein the linking member has a guiding slot, the first axle has a column body thereon, an extending direction of the guiding slot is inclined with respect to a first axial direction of the first axle, the column body is located in the guiding slot, and when the linking member is rotated relative to the first axle, the column body is moved along the guiding slot to drive the linking member to move along the first axle.

7. The hinge module as recited in claim 6, wherein the guiding slot has a first end and a second end opposite to each other, when the included angle between the first motion component and the second motion component is increased from the first angle to the second angle, the column body is moved from the first end toward the second end, and the second end blocks the column body to stop the third motion component from continuing to rotate relative to the first motion component.

8. The hinge module as recited in claim 6, wherein a length of the pushing portion along a second axial direction of the second axle is greater than or equal to a stroke length of the guiding slot along the first axial direction of the first axle.

9. The hinge module as recited in claim 6, wherein a length of the guiding slot along the first axial direction of the first axle is greater than a contact length between the pushing portion and the linking member along a second axial direction of the second axle.

10. The hinge module as recited in claim 2, comprising a first gear and a second gear, wherein the first gear is disposed on the first axle, the second gear is disposed on the second axle and engaged with the first gear, and when the included angle between the first motion component and the second motion component is increased from the first angle to the second angle, the third motion component is rotated relative to the second motion component by driving of the first gear and the second gear.

11. The hinge module as recited in claim 2, wherein when the included angle between the first motion component and the second motion component is the first angle, an included angle between the first motion component and the third motion component is the first angle.

12. The hinge module as recited in claim 2, wherein when the included angle between the first motion component and the second motion component is the second angle, an included angle between the first motion component and third motion component is the third angle.

13. The hinge module as recited in claim 2, wherein the second motion component has a stop portion, when the included angle between the first motion component and the second motion component is increased to the third angle, the stop portion abuts against the linking member to stop the second motion component from continuing to rotate relative to the first motion component.

14. A hinge module, comprising:
   a first motion component, a second motion component, and a third motion component, wherein the second motion component is connected between the first motion component and the third motion component and has a pulling portion; and
   an axle module and a linking member, the axle module comprising a first axle and a second axle, the linking member being pivoted to the first motion component by the first axle, the second motion component and the linking member being pivoted to the third motion component by the second axle, and the linking member being adapted to move along an axial direction of the axle module,
   wherein the second motion component is adapted to rotate in a second direction relative to the first motion component from a third operation state to a second operation state,
   when the second motion component continues rotating in the second direction relative to the first motion component from the second operation state, the pulling portion is in contact with the linking member by rotation of the second motion component,
   when the second motion component is rotated in the second direction relative to the first motion component from the second operation state to a first operation state, the pulling portion of the second motion component pulls against the linking member to drive the third motion component to be synchronously rotated more greatly than the second motion component in the second direction relative to the first motion component by the linking member.

15. The hinge module as recited in claim 14, wherein when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

16. The hinge module as recited in claim 15, wherein when the included angle between the first motion component and the second motion component is decreased from the third angle to the second angle, the second motion component is rotated about the second axle and relative to the first motion component, the first axle, the linking member, and the third motion component.

17. The hinge module as recited in claim 15, wherein when the included angle between the first motion component and the second motion component is decreased from the second angle to the first angle, the second motion component, the linking member, the second axle, and the third motion component are simultaneously rotated about the first axle and relative to the first motion component.

18. The hinge module as recited in claim 14, wherein a first axial direction of the first axle is parallel to a second axial direction of the second axle.

19. The hinge module as recited in claim 15, comprising a first gear and a second gear, wherein the first gear is disposed on the first axle, the second gear is disposed on the second axle and engaged with the first gear, and when the included angle between the first motion component and the second motion component is decreased from the second angle to the first angle, the third motion component is rotated relative to the second motion component by driving of the first gear and the second gear.

20. The hinge module as recited in claim 15, wherein when the included angle between the first motion component and the second motion component is the first angle, an included angle between the first motion component and the third motion component is the first angle.

21. The hinge module as recited in claim 15, wherein when the included angle between the first motion component and the second motion component is the second angle, an included angle between the first motion component and third motion component is the third angle.

22. A hinge module, comprising:
a first motion component, a second motion component, and a third motion component, wherein the second motion component is connected between the first motion component and the third motion component and has a pushing portion and a pulling portion; and
an axle module and a linking member, the axle module comprising a first axle and a second axle, the linking member being pivoted to the first motion component by the first axle, the second motion component and the linking member being pivoted to the third motion component by the second axle, and the linking member being adapted to move along an axial direction of the axle module,
wherein when the second motion component is rotated in a first direction relative to the first motion component from a first operation state to a second operation state, the pushing portion of the second motion component pushes against the linking member to drive the third motion component to be synchronously rotated more greatly than the second motion component in the first direction relative to the first motion component by the linking member, and to drive the linking member to move along the axial direction of the axle module,
when the second motion component continues rotating in the first direction relative to the first motion component from the second operation state, the pushing portion is separated from the linking member by movement of the linking member along the axial direction,
when the second motion component continues rotating in the first direction relative to the first motion component from the second operation state, the pulling portion is in contact with the linking member by rotation of the second motion component,
when the second motion component continues rotating in a second direction relative to the first motion component from the second operation state to the first operation state, the pulling portion of the second motion component pulls against the linking member to drive the third motion component to be synchronously rotated more greatly than the second motion component in the second direction relative to the first motion component in the second direction relative to the first motion component by the linking member, and to drive the linking member to move along the axial direction of the axle module.

23. The hinge module as recited in claim 22, wherein when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

24. The hinge module as recited in claim 23, wherein when the included angle between the first motion component and the second motion component is increased from the first angle to the second angle or decreased from the second angle to the first angle, the second motion component, the linking member, the second axle, and the third motion component are simultaneously rotated about the first axle and relative to the first motion component.

25. The hinge module as recited in claim 23, wherein when the included angle between the first motion component and the second motion component is increased from the second angle to the third angle or decreased from the third angle to the second angle, the second motion component is rotated about the second axle and relative to the first motion component, the first axle, the linking member, and the third motion component.

26. The hinge module as recited in claim 22, wherein a first axial direction of the first axle is parallel to a second axial direction of the second axle, the linking member is slidably disposed on the first axle and the second axle along the first axial direction of the first axle and the second axial direction of the second axle.

27. The hinge module as recited in claim 23, wherein the linking member has a guiding slot, the first axle has a column body thereon, an extending direction of the guiding slot is inclined with respect to a first axial direction of the first axle, the column body is located in the guiding slot, and when the linking member is rotated relative to the first axle, the column body is moved along the guiding slot to drive the linking member to move along the first axle.

28. The hinge module as recited in claim 27, wherein the guiding slot has a first end and a second end opposite to each other, when the included angle between the first motion component and the second motion component is increased from the first angle to the second angle, the column body is moved from the first end toward the second end, and the second end blocks the column body to stop the third motion component from continuing to rotate relative to the first motion component.

29. The hinge module as recited in claim 27, wherein a length of the pushing portion along a second axial direction of the second axle is greater than or equal to a stroke length of the guiding slot along the first axial direction of the first axle.

30. The hinge module as recited in claim 27, wherein a stroke length of the guiding slot along the first axial direction of the first axle is greater than a contact length between the pushing portion and the linking member along a second axial direction of the second axle.

31. The hinge module as recited in claim 23, comprising a first gear and a second gear, wherein the first gear is disposed on the first axle, the second gear is disposed on the second axle and engaged with the first gear, and when the included angle between the first motion component and the second motion component is increased from the first angle to the second angle or decreased from the second angle to the first angle, the third motion component is rotated relative to the second motion component by driving of the first gear and the second gear.

32. The hinge module as recited in claim 23, wherein when the included angle between the first motion component and the second motion component is the first angle, an included angle between the first motion component and the third motion component is the first angle.

33. The hinge module as recited in claim 23, wherein when the included angle between the first motion component and the second motion component is the second angle, an included angle between the first motion component and third motion component is the third angle.

34. The hinge module as recited in claim 23, wherein the second motion component has a stop portion, when the included angle between the first motion component and the second motion component is increased to the third angle, the stop portion abuts against the linking member to stop the second motion component from continuing to rotate relative to the first motion component.

35. The hinge module as recited in claim 34, wherein a length of the pulling portion along a second axial direction of the second axle is greater than a sum of lengths of the pushing portion and the stop portion along the second axial direction of the second axle.

36. The hinge module as recited in claim 22, wherein the linking member has a contact portion, the contact portion is configured to contact with the pulling portion, and a length of the contact portion along a second axial direction of the second axle is greater than a length of the pulling portion along the second axial direction of the second axle.

\* \* \* \* \*